March 26, 1940.  W. F. WATSON  2,194,578
FISHING REEL
Filed June 7, 1937
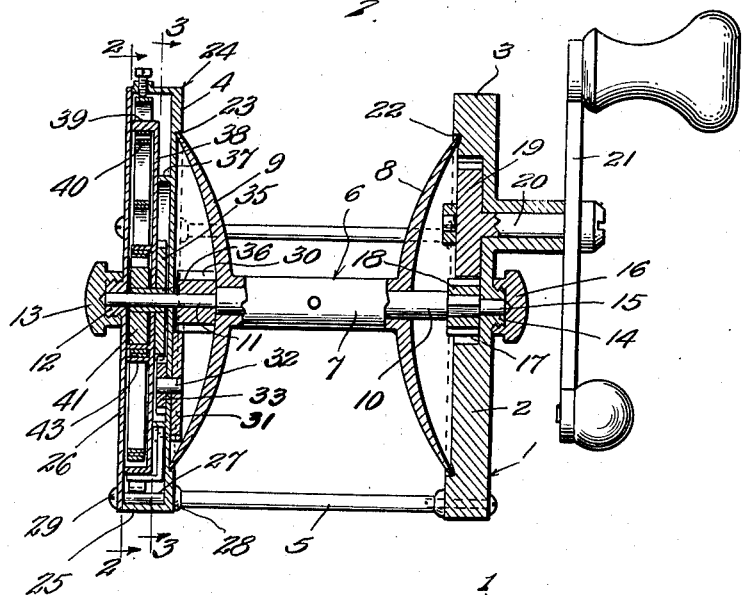
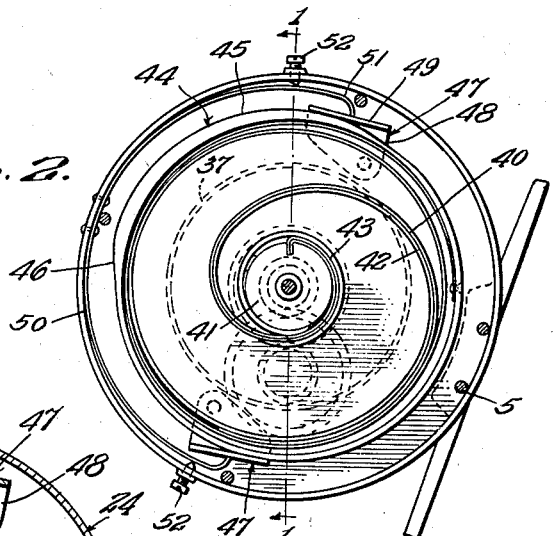
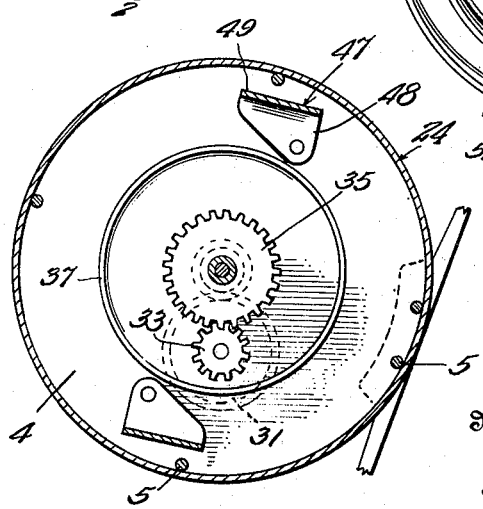
Inventor
W. F. Watson.
By Lacey & Lacey
Attorneys Patented Mar. 26, 1940

2,194,578

UNITED STATES PATENT OFFICE 2,194,578

FISHING REEL

William F. Watson, Bradenton, Fla.

Application June 7, 1937, Serial No. 146,909

7 Claims. (Cl. 242—84.5)

This invention relates to an improved fishing reel.

One object of the invention is to provide a fishing reel employing a spring and gear train which are associated with the spool employed and cooperate therewith in such a manner that the spool will not be permitted to unwind too rapidly during a casting operation so that objectionable backlash will be eliminated.

Another object of the invention is to provide a fishing reel wherein the gear train will permit the spring to be wound slowly as the spool rotates during a casting operation so that a steady retarding effect on the spool during said casting operation will be had, the amount of retarding effect being capable of adjustment and being controllable at all times.

The invention seeks, as a further object, to provide a fishing reel which makes use of a cooperating detent and cam surface, said cam surface being of such formation that rotation of the spool in the direction of winding will be relatively unretarded with respect to rotation in the direction of unwinding so that winding of the reel after a casting operation may be effected with the utmost facility.

As a still further object, the invention seeks to provide a fishing reel which will be simple and durable in construction, cheap to manufacture, and highly efficient in use.

During the reading of the following description it is believed that other and incidental objects will render themselves apparent.

My invention is illustrated in the accompanying drawing, wherein:

Figure 1 is a longitudinal sectional view of my improved fishing reel, on the line 1—1 of Figure 2, looking in the direction of the arrows.

Figure 2 is a vertical sectional view on the line 2—2 of Figure 1, looking in the direction of the arrows.

Figure 3 is a vertical sectional view on the line 3—3 of Figure 1, looking in the direction of the arrows.

Referring now more particularly to the drawing, wherein, as will be seen, like numerals of reference designate like parts throughout the various views, the numeral 1 indicates, in general, a fishing reel having a frame 2 formed with a relatively thick end wall 3 and a relatively thin stationary end plate 4. The wall 3 and plate 4 are connected by tie rods 5 which are preferably five in number. The wall 3 and plate 4 are preferably circular in shape and are adapted to have mounted concentrically thereof and therebetween, a spool 6. The spool has an axial shank 7 formed with integral end plates 8 and 9 which are concavo convex in shape. The spool is mounted in the frame by means of a shaft 10 which has the axial shank 7 fixed to it and, at one end, is reduced, as shown at 11, and extends into an axial sleeve 12 having a cap bearing 13 thereon. The other end of the shaft 10 is reduced near its free end, as shown at 14, and extends through the wall 3 into a sleeve 15 which has a cap bearing 16 thereon. It will be understood that the spool is mounted for ready rotation within the frame. Carried on the reduced end portion 15 of the shaft 10 and axially within a socket 17 in the relatively thick end wall 3 is a pinion 18 which turns with the shaft and is adapted for meshing with a relatively large pinion 19 carried by a stub shaft 20 which is journaled through the wall 3 and has secured to its outer end a crank handle 21. Rotation of the crank handle will effect rotation of the pinion 19, which, by virtue of the fact that it meshes with the relatively small pinion carried by the shaft 10, will cause rotation of said shaft and the spool carried thereby at a high rate of speed.

As will be seen in Figure 1, the circumferential edges of the end plates 8 and 9 are feathered and extend to rotate within a groove 22 in the inner surface of the end wall 3 and a groove 23 in the end plate 4.

The relatively thin end plate 4 comprises a portion of a housing which is indicated in general by the numeral 24 and, in addition to the plate 4, includes an end flange 25 and an end plate 26, said end plate 26 carrying the sleeve 12. The tie rods 5 extend through the wall 4 and are reduced at 27 to define shoulders 28 to limit the inward movement of the housing 24 on the rods 5 so that said housing will be maintained in a proper operative position. Screws 29 are adapted to be threaded into the ends of the reduced portions 27 of the rods 5 and serve effectually to retain the end plate 26 and housing 24 in proper operative position.

The reduced portion 11 of the shaft 10 of the spool 6 carries a relatively wide pinion 30 which, of course, is fixed to the shaft 10 and, as will be seen, is disposed between the opposed inner surfaces of the plate 9 and the relatively thin plate 4. Carried on the plate 4 and meshing with the pinion 11 is a relatively large gear 31 which is rigidly mounted on a shaft 32. The shaft 32 is journaled through the plate 4 and at the opposite side of the wall 4, is disposed a pinion 14 which is rigidly mounted on the shaft 32, and is adapted to mesh with a relatively large gear 35 which is rigidly mounted on a sleeve 36 surrounding and loosely receiving the reduced portion 11 of the shaft 10. The sleeve 36 serves as a spacing sleeve, in addition to mounting the gear 35, and extends the major distance between the outer surface of the wall 4 and the inner surface of the wall 26. Carried on the wall 4 at its outer surface and within the housing 24, is a right angularly disposed circular flange 37. The flange 37 serves effectually to space a rotatable disc 38 carried on the reduced portion 11 in overlying relation to the gear 35 and is provided with an annular flange 39. The rotatable disc 38 is adapted to rotate freely about the sleeve 36.

Carried in overlying relation to the disc 38 at the opposite side thereof from that confronting the gear 35, is a coil spring 40. The coil spring 40 is confined within the disc by the flange 39 and has its inner end securely fastened to an anchoring hub 41 which is fixed to the sleeve 36. The outer end of the coil spring is riveted or otherwise secured to the flange 39. In order to reinforce the inner end of the spring I provide a relatively short spring 42 which provides the necessary added strength near the hub where the greatest amount of stress occurs. A relatively heavy housing band 43 surrounds the hub and effectually retains the inner ends of the springs 40 and 42 in position in the notch of the anchoring hub 41, as shown in Figure 2.

As best seen in Figure 2 of the drawing, the flange 39 is provided, throughout a portion of its circumference, with a retarding cam 44 which, as will be observed, is gradually increased in thickness from one end to provide a sloping cam surface 45, the other end portion of the cam being abruptly reduced in thickness to form a steeply inclined surface 46. The retarding cam 44 is preferably formed integral with the flange 39. It should be noted that the flange 39 is of slightly greater height than that of the coil spring so that said coil spring will be permitted to operate freely on the face of the disc 38.

In order to retard the rotation of the disc 38 during a casting operation, I provide detents 47 which are pivotally mounted on the wall 4 and are preferably two in number. The detents, as will be seen, are diametrically disposed and each comprises a flat portion 48 and a right angularly disposed engaging member 49 which is flat throughout its length. As seen in Figure 2, the walls 48 are adapted to overlie the wall 4 beneath the rotatable disc 38 and the members 49 are adapted to engage the edge surface of the retarding cam 44. A spring 50, which is semi-circular in formation, is secured, preferably medially of its length, to the flange 25 of the housing 24 and, as will be seen, the secured portion of the spring is located substantially medially on the circumference between the points on said circumference overlying the detents 47. As shown at 51, each end of the spring 50 is turned inwardly to engage the detent 47 so that said adjacent detent will be urged toward the cam 44. Adjusting screws 52 are threaded through the flange 25 near the ends of the spring 51 so as to permit adjustment of the tension of the spring on said detents 47 whereby retarding action of the detents on the cam 44 may be effectually controlled.

In use, after a fishing line has been wound on the spool 6 and the line is ready to be cast, the line is cast in the usual manner. As the line pays out from the spool, the spool will, of course, rotate and will transmit said rotative movement, through the gears 30, 31, 33 and 35, to the hub 41, so that said spring will be caused to wind slowly for effecting a uniform retarding of the velocity of rotation of the spool. The rotation of the sleeve 36 and the hub 41, which causes the winding of the spring will, by virtue of the gears, be much slower than that of the spool 6. A uniform casting of the line will thus be permitted so that objectionable backlash will not be present. As the disc 38 revolves, said disc being connected with the sleeve by the coil spring 40, the detents 47 will ride on the wall 45 and will cause the rotatable disc to be detained until the tension of the spring 40 becomes great enough to overcome the tension of the spring 50 and move the detent over the high point of the surface 45 of the cam 44. The disc will then make a half turn and, upon completion of said half turn, the cam portion 44 will come into engagement with the opposite detent 47 which will then effect the same retarding operation. It is particularly desired to point out that, during casting of the line, a retarding influence on the spool is provided by the two detents 47 which alternately engage the cam 44 and too rapid rotation of the spool and backlashing thereof, with resultant snarling of the line, will be avoided. When it is desired to wind the line upon the spool, the reverse action will take place. That is to say, rotation of the spool in the opposite direction will be permitted as the surface 46 of the cam 44 will quickly shift the detents outwardly and allow the cam 44 to move past the detents 47. No undue pressure will, of course, be brought to bear upon the spring, due to the fact that the detents will, during this operation, effect no great retarding action on the disc 38. The retarding action of the detents may, as hereinbefore described, be readily adjusted merely by tightening or loosening the adjusting screws 52, which bear on the spring 50 and control the effect of said spring on said detents. It should be understood that although I have shown two of the detents 44, only one may be employed, if desired. In such case, a relatively short spring 50 would be employed. Moreover, if more than two detents are employed, they may be provided without departing from the scope of the invention.

It is believed that a reading of the foregoing description will disclose that I have provided a new and improved anti-backlash fishing reel of simple construction which will be highly efficient in operation.

Having thus described the invention, what I claim is:

1. A fishing reel including a frame, a spool rotatable therein, means carried at one end of the frame for manually effecting rotation of the spool, a rotatable disc carried by the frame at its opposite end, a spring carried by the disc and secured at one end thereto, gears rotatably mounted and connecting the other end of the spring with the spool whereby said spool and disc will be resiliently connected, a detent carried by the frame and engageable with the disc, spring means for urging the detent towards the disc for effecting a retarded action on the disc as the spool rotates, and means for adjusting said spring means and regulating tension thereof.

2. A fishing reel including a frame, a spool rotatable therein, means carried by the frame at one end for manually rotating the spool, a rotatable disc carried by the frame at its opposite end, a spring at a side of the disc having one end secured to the disc, gearing between the other end of the spring and the spool and together with the spring providing a resilient connection between said disc and spool, said disc having a flange provided with a cam at one point about its circumference, a detent carried by the frame and engageable with the cam for intermittently retarding rotation of the disc as the spool rotates, spring means for urging said detent towards said disc, and means for adjusting said spring means and controlling binding action thereof against the cam.

3. A fishing reel including a frame, a spool, a shaft having the spool fixed thereto and rotatably mounting the spool in said frame, means carried at one end of the frame for manually rotating the shaft and the spool, a housing at the opposite end of the frame forming a part of the frame, said shaft being journaled through the housing, a pinion fixed to the shaft, gears rotatably carried by the housing and interconnected, one of said gears meshing with the pinion, a third gear rotatably carried by the housing and having a sleeve rotatably receiving said shaft, a disc rotatable about the sleeve within the housing, an anchoring hub fixed upon said sleeve within the housing, a spring at a side of the disc having an end anchored to the anchoring hub and its opposite end anchored at the outer edge of the disc, said third gear being in mesh with certain of said second mentioned gears whereby said spring will be connected through all of said gears and the pinion with the spool, said gearing causing said disc to rotate at slower speed than said spool rotates during a casting operation, a detent movably carried by the housing and engageable with the disc for effecting retarding of rotation of the disc, and resilient means for urging the detent towards said disc and causing the detent to frictionally grip the disc and resist rotation of the disc.

4. A fishing reel including a frame, a spool rotatably mounted in the frame and having a shaft fixed thereto, a housing at one end of the frame and spool and journaling the shaft, said housing having a wall, gears carried by the shaft and said wall and being in meshing relation, a rotatable disc in the housing about the shaft, a spring at one side of the disc having one end secured to the disc and its other end connected with one of said gears whereby said disc will be resiliently connected with the spool, said disc having a flange provided with a cam surface at one point about its circumference formed with a gradually inclined surface and an abruptly declined surface, and a spring actuated detent carried by the housing and being engageable on said gradually inclined wall of the cam for intermittently retarding rotation of said disc as the spool is rotated in one direction, said retarding of rotation of said disc effecting a slow intermittent winding of the spring and said detent being adapted to ride on said inclined surface to the extent thereof and then be freed therefrom for permitting partial free rotation of the disc, said abruptly declining surface permitting operation of the spool in the other direction without appreciable retarding movement.

5. A fishing reel including a frame, a spool mounted in the frame for rotation therein, said frame having a housing at one end thereof and said spool having fixed thereto a shaft provided with a reduced portion extending through the housing, a relatively wide pinion carried by the shaft between the spool and housing and turning with the shaft and spool, a gear within the housing rotatable about the reduced portion of the shaft, said gear having a sleeve through which the reduced portion of the shaft extends, a shaft journaled through the housing and having a pinion fixed at one end meshing with the said gear and a gear fixed at its other end meshing with the wide pinion, a rotatable disc mounted in the housing about the sleeve and having a flange, an anchoring hub fixed to the sleeve, a coil spring secured at its ends to the anchoring hub and the flange for resiliently connecting the disc with the sleeve, said flange having a cam surface, a detent pivotally carried by the housing and engageable with said cam surface as the disc is rotated, and means urging the detent toward the surface of the cam into position for frictional binding engagement with the flange of the disc to cause retarded movement of the disc, the said retarded movement being transmitted through the spring and gears and relatively wide pinion to the spool whereby as said spool is rotated the spring will be wound for effecting a retarding movement of the spool and preventing too rapid rotation thereof when the spool is rotated in one direction.

6. A fishing reel including a frame, a spool therein, said frame including a housing carried at one end thereof, said housing having a relatively thin wall, an end flange and an end plate, a shaft rigidly carrying the spool and rotatably mounted in the frame with one end portion extending through the housing, a pinion fixed to the shaft, a pair of gears carried by the relatively thin wall at opposite sides thereof and turning together, one of the pair of gears meshing with the pinion, a third gear loose about the shaft and meshing with the other one of the pair of gears and having a sleeve rotatably receiving the shaft, a rotatable disc in the housing and rotatable about the sleeve, an anchoring hub fixed to said sleeve against said disc, a coil spring at one side of said disc, said disc having a flange, said coil spring having its inner end secured to the anchoring hub and the outer end secured to the flange of said disc, a cam carried by the flange of said disc, a detent pivotally carried by the housing, a spring urging the detent toward the flange of the disc for engagement with the cam as the disc rotates, and means carried by the flange of the housing for adjusting the tension of the last mentioned spring on the detent whereby the retarding effect of the detent on the disc may be controlled, said coil spring and gears transmitting retarded rotative movement from said disc to the spool as the spool rotates in one direction so that backlash will be prevented.

7. A device of the class described including a frame, a spool in said frame fixed to a shaft journaled through end portions of the frame and rotatably mounting the spool in the frame, a rotatable disc in the frame rotatably mounted about said shaft, a pinion fixed to the shaft, a pair of connected concentric gears rotatably carried by the frame with one meshing with said pinion, a third gear loosely carried by the shaft and rotatable thereabout and meshing with the second gear of the pair of gears, said third gear having a sleeve rotatably receiving the shaft, an anchoring hub carried by said sleeve, a spring resiliently connecting the anchoring hub with the rotatable disc, a reinforcing spring carried by the anchoring hub and disposed in superposed relation with the first mentioned spring throughout a portion of its length, means securing the inner ends of the springs to the anchoring hub, and means carried by the frame and engageable with the disc for retarding rotation of the disc, said retarded rotation of the discs being transmitted through the springs and the intermeshing gears and pinion to the spool for preventing too rapid rotation of the spool during rotation of the spool in one direction.

WILLIAM F. WATSON.